Sept. 13, 1949.     J. A. HENNE     2,481,665
FILM WINDING MECHANISM FOR CAMERAS
Filed March 20, 1947
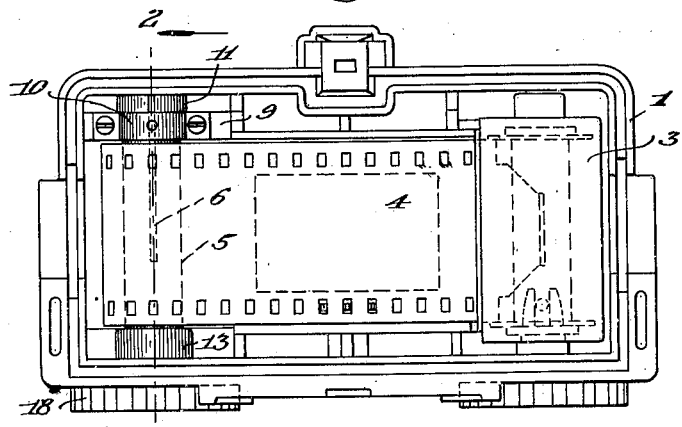
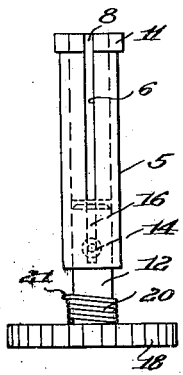
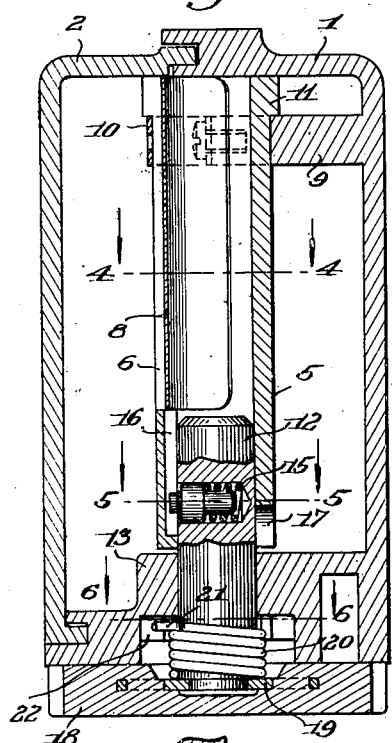
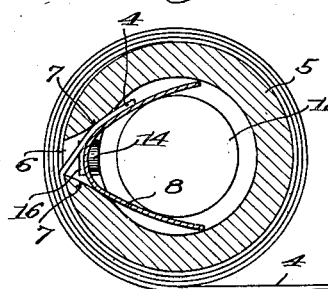
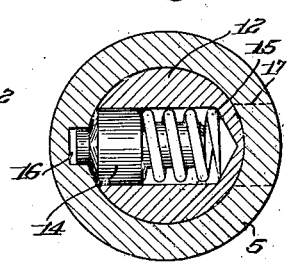
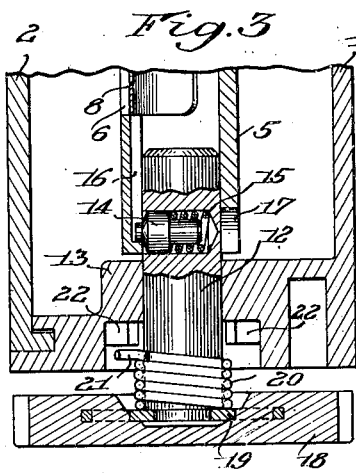
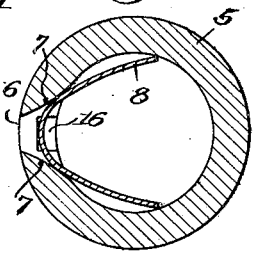
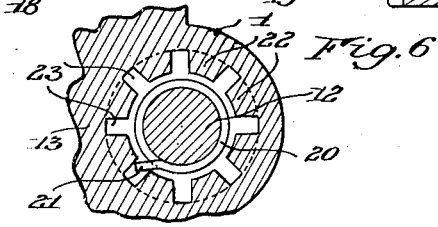
INVENTOR.
Julius A. Henne
BY Harold E. Stonebraker
his Attorney Patented Sept. 13, 1949

2,481,665

UNITED STATES PATENT OFFICE 2,481,665

FILM WINDING MECHANISM FOR CAMERAS

Julius A. Henne, Rochester, N. Y., assignor to Webster Industries, Inc., Webster, N. Y., a corporation of New York Application March 20, 1947, Serial No. 735,986

3 Claims. (Cl. 242—74)

This invention relates to film winding mechanism for cameras of the general type in which a film is wound onto a spool permanently arranged within a camera case between successive exposures and rewound from said spool on to a removable holder after the film is completely exposed, and it has for its purpose to afford a simple and practical structure for quickly attaching one end of a film to a permanently located rotatable spool or support and controlling the spool in such fashion as to permit the necessary winding and rewinding operations.

More particularly, the invention is designed to enable the use of a film supporting spool constructed of plastic material and has for its purpose to afford an arrangement in connection with a plastic spool or support that enables readily attaching the end of a film thereto and securely holding the film on the spool during the winding operation.

Another object of the invention is to provide a practical and simple assembly for a spool constructed of plastic material that enables supporting the spool within a case constructed of plastic material and permits the necessary control of the spool-winding mechanism whereby the plastic spool is movable in either direction for winding or rewinding and is positively maintained against rewinding movement while positioned for the winding operation.

A further object of the invention is to afford an economical construction enabling the use of a spool constructed of plastic material of hollow tubular formation and associated with a film-gripping means that is securely held within the spool and functions at all times to enable readily positioning the end of a film in operative engagement with the spool and holding it securely during the winding operation.

To these and other ends, the invention consists in the construction and arrangement of parts that will appear clearly from the following description when read in conjunction with the accompanying drawings, the novel features being pointed out in the claims following the specification.

In the drawings:

Fig. 1 is a plan view of a camera case with the cover portion removed and showing applied thereto a preferred embodiment of the invention;

Fig. 2 is a transverse vertical sectional view on the line 2—2 of Fig. 1 looking in the direction indicated, and showing the film-winding mechanism in position for winding a film on the spool;

Fig. 3 is a similar view, partially broken away, and showing the film-winding mechanism adjusted to release the spool and permit rewinding of the film;

Fig. 4 is a vertical sectional view on the line 4—4 of Fig. 2 looking in the direction indicated;

Fig. 5 is a vertical sectional view on the line 5—5 of Fig. 2 looking in the direction indicated;

Fig. 6 is a sectional view on the line 6—6 of Fig. 2 looking in the direction indicated;

Fig. 7 is a detail sectional view in the same plane as Fig. 4 with the film omitted, and Fig. 8 is a plan view of the spool and film-winding mechanism.

Referring more particularly to the drawings in which like reference numerals refer to the same parts throughout the several views, 1 designates the body portion of the camera case and 2 the removable cover portion, which are preferably made of plastic material, and arranged within the body 1 is a rotatable support for a cartridge 3 from which the film 4 is wound successively after each exposure, as usual in this general type of camera, and the present invention has to do particularly with the means for receiving the film as it is wound from the cartridge 3 and for attaching the free end of the film to the spool or tube on which it is wound, also the mechanism for locking the film against rewinding while the parts are adjusted for winding, permitting rewinding when the film has been completely exposed, and adapting the structure to a case and spool or tubular support made from plastic material.

To attain these objectives, there is provided a rotatable film support consisting of a hollow cylindrical tube 5 formed of plastic material, the cylindrical wall having substantial thickness as shown and as preferred when using plastic material. The tubular film support has a longitudinal slot 6 which preferably extends from one end of the tube to a point spaced from its opposite end and is narrowest at its outer edge, the slot being defined by inwardly diverging opposite surfaces 7 which are convexly curved as shown, affording a wider portion at the inner edge of the slot, and merging into the interior curved surface of the tube along continuous curves.

The loose end of the film is attached to the tubular support by being entered through the narrow outer portion of the slot 6 and is then gripped between a curved surface 7 of the tube and the adjacent surface of a flexible spring plate 8 that is of generally rectangular form and wider than the interior diameter of the tube.

The plate 8 is preferably of thin spring metal, and when inserted into the hollow tubular support from the slotted end of the latter is flexed sufficiently to permit its being received within the tube, and after being pushed endwise into place within the tubular support, the spring plate occupies the position shown in Fig. 4 with its longitudinal edges engaging opposite points of the interior of the tube and its convexly curved central portion intermediate its longitudinal edges extending into the slot 6 and located within the wider portion 7 at the base of the slot.

With this arrangement, the free end of a film can be readily inserted through the narrow slot 6 and thence into either of the V-shaped pockets formed by the adjacent contacting surfaces of the tubular support and the spring metal gripping plate which is sufficiently yieldable to permit the paper readily to move between the plastic and metal surfaces and at the same time possesses sufficient gripping action to hold the end of the film with such force as to permit it to be wound on to the tubular support when the latter is turned. The tubular support rests in a bearing formed in a wall 9 of the plastic case while 10 designates a metal strap surrounding the tubular support and holding it in engagement with the bearing 9, the strap being positioned adjacent to a shoulder 11 at the slotted end of the tubular support.

In order to effect the necessary movement of the plastic tubular support, there is provided a rotatable metal pin 12 mounted in an opening formed in a wall 13 of the plastic case, the pin 12 being inserted through the opening in the wall 13 and into the adjacent end of the tubular support 5. The pin 12 is held in locked engagement with the tubular support 5 against relative rotation by means of a spring-actuated locking plunger 14 that is transversely movable in the pin and mounted for this purpose in a transverse opening and moved outwardly under the impulse of a spring 15 into a slot 16 that extends longitudinally of the tubular support 5 on its interior surface.

Thus the locking plunger 14 engaged with the slot 16 prevents relative turning between the tubular support and the pin 12 while permitting the latter to be moved longitudinally of the tubular support to permit rewinding the film, as will be described presently. 17 designates an opening formed at the outer end of the tubular support 5 and of sufficient size to permit insertion of the locking plunger 14 therethrough for assembling. To assemble these parts, the pin 12 is first inserted through the wall 13 into the adjacent end of the tubular support 5 and turned within the tubular support until the opening which receives the locking plunger 14 is alined vertically with the opening 17, whereupon the spring 15 and locking plunger 14 are successively inserted through the opening 17 of the tubular support into the transverse opening in the pin, and the locking plunger 14 is then pressed inwardly against the action of the spring 15 by any suitable tool to permit turning the pin 12 relatively to the tubular support 5 until the locking plunger 14 is out of alinement with the opening 17. The pin is then turned further until the locking plunger 14 is in alinement with the slot 16, and the spring 15 then actuates the locking plunger outwardly into said slot and holds the parts permanently in such locked relation.

The pin 12 and tubular support 5 can then be turned in one direction for winding during which it is necessary to prevent reverse movement of the tubular support 5, and when the film has been entirely exposed and it is desired to rewind it onto its removable spool, the pin 12 can be moved longitudinally with respect to the tubular support 5 owing to the slot 16 permitting endwise movement of the locking plunger 14 while preventing relative rotation between these parts, such endwise movement permitting the pin 12 to be shifted to a position in which it is unlocked for reverse movement or rewinding, and this is accomplished in the following manner.

The pin 12 is provided at its outer end with a handle or knob 18 by which it is turned, the handle 18 being preferably of plastic material and attached to the metal pin 12 by means of a metal plate 19 embedded in the plastic handle 18 and suitably fastened to the metal pin, while 20 designates a coil spring closely surrounding the pin 12 and arranged between the metal plate 19 and the wall 13. The spring 20 has an outwardly extending end 21 that projects radially away from the pin 12 and between two of the projections 22 which are spaced from each other and arranged circularly around the pin 12 on the outer surface of the wall 13. The projections 22 thus afford radial recesses or openings 23 which receive the radially extending end 21 of the spring, as shown in Fig. 6, and with this arrangement, assuming the handle 18 and pin 12 to be adjusted inwardly as shown in Fig. 2 for winding the film on to the tubular support, when the handle and pin 12 are turned clockwise with reference to Fig. 6, the end 21 of the coil spring engages the adjacent projection and is held thereby, which prevents the spring from compressing against the pin 12 and permits turning of the pin within the loose spring and with it the tubular support 5. If while these parts remain in the winding position, it is attempted to turn the handle and pin in the reverse direction, this is effectually prevented because the end 21 of the spring moves anti-clockwise, see Fig. 6, against the adjacent projection 22 and compresses the spring about the pin 12 to hold the pin tightly by frictional engagement against movement. The pin is released from the locking action of the spring 20 by pulling the handle 18 and pin 12 outwardly to the position shown in Fig. 3, in which position the projecting end 21 of the spring is out of the plane of the projections 22, and the pin and tubular support are then free to turn in the reverse direction when the removable spool at the opposite end of the case is turned to rewind the film in the cartridge.

While the invention has been described with relation to the embodiment shown, it is not confined to the details illustrated, and this application is intended to cover such modifications or departures as may come within the purposes of the improvements or the scope of the following claims.

I claim:

1. In a camera, film winding mechanism comprising a rotatable tubular film support having a slot extending longitudinally of its wall, and a generally rectangular flexible spring plate of greater width than the interior diameter of said tubular support before insertion therein and arranged within said tubular support in flexed U-shaped form with its longitudinal edges yieldably engaging opposite points of the interior surface and acting to retain the plate in position with its convex central portion intermediate its longitudinal edges extending into said slot.

2. In a camera, film winding mechanism comprising a rotatable tubular film support including a wall of substantial thickness having a slot extending longitudinally thereof, said slot being narrowest at its outer edge and defined by inwardly diverging surfaces affording a wider portion at its inner edge, and a generally rectangular flexible spring plate of greater width than the interior diameter of said tubular support before insertion therein and arranged within said tubular support in flexed U-shaped form with its longitudinal edges yieldably engaging opposite points of the interior surface and acting to retain the plate in position with its convex central portion intermediate its longitudinal edges located in said wider portion of the slot.

3. In a camera, film winding mechanism comprising a rotatable tubular film support including a wall of substantial thickness having a slot extending longitudinally thereof, said slot being narrower at its outer edge and defined by inwardly diverging convex surfaces forming a continuous curve with the interior surface of the tubular support and affording a wider portion at the inner edge of the slot, and a generally rectangular flexible spring plate of greater width than the interior diameter of said tubular support before insertion therein and arranged within the tubular support in flexed U-shaped form with its longitudinal edges yieldably engaging opposite points of the interior surface and acting to retain the plate in position with its convex central portion intermediate its longitudinal edges extending into the wider portion of said slot and contacting said convex surfaces.

JULIUS A. HENNE.

REFERENCES CITED

The following references are of record in the file of this patent:

UNITED STATES PATENTS

| Number | Name | Date |
| --- | --- | --- |
| 887,472 | Gammeter | May 12, 1908 |
| 1,394,401 | Berry | Oct. 18, 1921 |
| 1,438,212 | Baluta | Dec. 12, 1922 |
| 1,564,435 | May | Dec. 8, 1925 |
| 1,578,894 | Joy | Mar. 30, 1926 |
| 2,180,023 | Lucker | Nov. 14, 1939 |
| 2,182,398 | Gantier | Dec. 5, 1939 |